US 8,217,978 B2

(12) United States Patent
Amada et al.

(10) Patent No.: US 8,217,978 B2
(45) Date of Patent: Jul. 10, 2012

(54) OPTICAL SCANNING APPARATUS, AN IMAGE FORMATION APPARATUS, AND A PHASE MODULATION METHOD

(75) Inventors: Taku Amada, Kanagawa (JP); Tomohiro Nakajima, Tokyo (JP); Akihisa Itabashi, Tokyo (JP); Seizo Suzuki, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1535 days.

(21) Appl. No.: 11/710,907

(22) Filed: Feb. 27, 2007

(65) Prior Publication Data

US 2008/0204852 A1    Aug. 28, 2008

(30) Foreign Application Priority Data

Feb. 27, 2006   (JP) .................................. 2006-050172

(51) Int. Cl.
*B41J 2/47* (2006.01)
(52) U.S. Cl. ...................................................... 347/239
(58) Field of Classification Search .................. 347/231, 347/241, 243, 244, 256, 258–261, 239, 255; 359/196.1–218.1
See application file for complete search history.

(56) References Cited

U.S. PATENT DOCUMENTS

| 7,403,316 B2 * | 7/2008 | Amada ...................... 359/204.1 |
| 2004/0032631 A1 | 2/2004 | Amada et al. |
| 2004/0057096 A1 | 3/2004 | Amada et al. |
| 2008/0055713 A1 | 3/2008 | Ogasawara et al. |

FOREIGN PATENT DOCUMENTS

| JP | 10-239939 | 9/1998 |
| JP | 2001-100127 | 4/2001 |
| JP | 2001-133718 | 5/2001 |
| JP | 2003-302595 | 10/2003 |
| JP | 2003-337293 | 11/2003 |
| JP | 2005-292349 | 10/2005 |
| WO | WO 2005/106865 A1 | 11/2005 |

* cited by examiner

*Primary Examiner* — Hai C Pham
(74) *Attorney, Agent, or Firm* — Dickstein Shapiro LLP

(57) ABSTRACT

An optical scanning apparatus, an image formation apparatus, and a phase modulation method are disclosed. The optical scanning apparatus includes a liquid crystal device for deflecting an optical beam irradiated by a semiconductor laser. The driving voltages for the liquid crystal device are controlled based on, e.g., the temperature of the liquid crystal device so that degradation of the diameter of a spot of the optical beam due to wavefront aberration is prevented.

12 Claims, 13 Drawing Sheets

OPTICAL SCANNING APPARATUS, AN IMAGE FORMATION APPARATUS, AND A PHASE MODULATION METHOD

BACKGROUND OF THE INVENTION

1. Field of the Invention

The present invention relates to an optical scanning apparatus, an image formation apparatus, and a phase modulation method. The present invention especially relates to an optical scanning apparatus wherein a photo conductor is scanned by an optical beam, an image formation apparatus that includes the optical scanning apparatus, and a phase modulation method that modulates a phase of a liquid crystal device for deflecting an optical path of the optical beam that scans the photo conductor.

2. Description of the Related Art

Conventionally, image formation apparatuses include an optical scanning apparatus for forming a latent image on a photo conductor, wherein an optical beam irradiated by a luminous source is scanned by a deflecting unit such as a polygon mirror. With the conventional optical scanning apparatus, raising the processing rate is realized by raising the rotating speed of the polygon mirror.

Such image formation apparatuses are often used in on-demand printing systems that provide simple printing. There are increasing requirements for improvements in productivity and image quality. Then, in recent years and continuing, some of the image formation apparatuses are provided with an optical scanning apparatus that includes a multi-beam luminous source having two or more light emitting points (luminous channels) built into one package, where two or more optical beams are irradiated from corresponding light emitting points; or alternatively, two or more semiconductor lasers, each of which irradiates a single beam. In addition, the rotating speed of the polygon mirror is being raised.

Here, problems with the multi-beam luminous source are that it is difficult to increase the number of channels for manufacturing reasons, that it is difficult to remove thermal or electric crosstalk, and that it is difficult to use a short wavelength. For these reasons, the multi-beam luminous source tends to be expensive. Accordingly, an image formation apparatus tends to be expensive if the multi-beam luminous source is used.

On the other hand, an optical scanning apparatus that uses two or more single beam semiconductor lasers as the luminous source has a problem in that a beam spot arrangement (beam pitch, and scanning line interval) at a scanned surface of a photo conductor fluctuates due to a change in the surrounding environment, and a secular change of the scanning apparatus. Then, a method of rectifying the problem (such as re-arrangement of the beam spot on the scanned surface) is proposed (for example, Patent Reference 1 and Patent Reference 2), wherein a liquid crystal device is provided in an optical path of the optical beam, and is driven by an electrical signal according to the fluctuation of the beam spot.

According to the method proposed by Patent Reference 1 and Patent Reference 2, a suitable voltage is applied to a liquid crystal layer of the liquid crystal device for deflecting the optical beam, and a refraction index of the optical beam at the liquid crystal layer is controlled by generating an electric potential distribution with a fixed gradient in the liquid crystal layer.

However, as a matter of fact, even if the electric potential distribution with the fixed gradient is generated in the liquid crystal layer, the gradient of the refraction index generated in the liquid crystal layer is not necessarily fixed. For example, the gradient of the refraction index takes a curved shape that can be better approximated by a high order polynomial. If the optical beam is made incident on the liquid crystal layer that has the refractive index distribution in the curved shape, the liquid crystal layer functions as a lens for the optical beam. That is, not only is the optical path of the optical beam deflected, but also wavefront aberration is generated, posing a problem. Further, when the temperature of the liquid crystal device changes the refractive index distribution is susceptible to change, causing a characteristic of the liquid crystal layer to fluctuate.

[Patent Reference 1] JPA 2003-302595
[Patent Reference 2] JPA 2003-337293

SUMMARY OF THE INVENTION

The present invention was made under the situations as described above, and provides an optical scanning apparatus, an image formation apparatus, and a phase modulation method that substantially obviate one or more of the problems caused by the limitations and disadvantages of the related art.

Specifically, the present invention provides an optical scanning apparatus that can prevent degradation of the diameter of a beam spot of an optical beam condensed on a scanned surface of a photo conductor by reducing the amount of wavefront aberration of the optical beam that penetrates through a liquid crystal device.

Further, the present invention provides an image formation apparatus that can prevent quality degradation of an output image.

Further, the present invention provides a phase modulation method of the liquid crystal device that deflects the optical beam penetrating through the liquid crystal device, avoiding degradation of the diameter of the beam spot of the optical beam that condenses on the scanned surface of the photo conductor.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by an optical scanning apparatus, an image formation apparatus, and a phase modulation method particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides an optical scanning apparatus, an image formation apparatus, and a phase modulation method as follows.

MEANS FOR SOLVING A PROBLEM

The embodiment of the present invention provides an optical scanning apparatus that scans a scanned surface with an optical beam irradiated by a luminous source. The optical scanning apparatus includes a liquid crystal device for deflecting an optical path of the optical beam based on first and second driving voltages, and a wavefront aberration control unit for controlling the first and the second driving voltages so that wavefront aberration generated in the liquid crystal device is reduced.

With the configuration described above, the amount of the wavefront aberration generated in connection with a phase modulation of a liquid crystal layer is reduced by the wavefront aberration control unit, when refractive power is generated in the liquid crystal layer by a voltage applied to the liquid crystal layer of the liquid crystal device. Consequently, degradation of the diameter of a spot of the optical beam deflected by the liquid crystal device can be prevented.

According to an aspect of the embodiment, the wavefront aberration control unit controls a reference voltage that is a middle voltage between the first and the second voltages, and the amount of the wavefront aberration is reduced.

According to another aspect of the embodiment, the wavefront aberration control unit controls the reference voltage according to a deflection angle of the optical beam.

According to another aspect of the embodiment, the optical scanning apparatus includes a beam waist position detecting unit for detecting a beam waist position of the optical beam. There, the wavefront aberration control unit reduces the amount of the wavefront aberration based on a detection result of the beam waist position detecting unit.

According to another aspect of the embodiment, the optical scanning apparatus includes a temperature detecting unit for detecting the temperature near the liquid crystal device. There, the wavefront aberration control unit reduces the amount of the wavefront aberration based on a detection result of the temperature detecting unit.

According to another aspect of the embodiment, the optical scanning apparatus includes an optical system that generates a power component for moving the position of the beam waist of the optical beam in a direction away from the luminous source when the temperature of the liquid crystal device is lower than predetermined temperature, and for moving the position of the beam waist of the optical beam in a direction toward the luminous source when the temperature of the liquid crystal device is higher than the predetermined temperature.

According to another aspect of the embodiment, the power component of the optical system takes a minimum magnitude near the median of a working temperature range of the liquid crystal device.

According to another aspect of the embodiment, the reference voltage takes a value that minimizes the position fluctuation of the beam waist approximately at the median of the working temperature range of the liquid crystal device.

Another aspect of the embodiment provides an image formation apparatus, wherein an image is formed based on a latent image formed on the scanned surface. Here, the image formation apparatus includes the optical scanning apparatus for forming the latent image on the scanned surface, and a processing unit for forming the image based on the latent image formed on the scanned surface.

According to the image formation apparatus, the image is formed based on the latent image that is formed on the scanned surface by the optical scanning apparatus of the present invention. Therefore, the latent image is formed on the scanned surface by the optical beam, the diameter of the beam spot of which optical beam is not degraded, and a high quality image is output as a result.

Another aspect of the embodiment provides a phase modulation method of phase-modulating the liquid crystal device for deflecting the optical beam to scan the scanned surface. The phase modulation method includes a prediction step of predicting an amount of the wavefront aberration generated when the optical beam is deflected by the liquid crystal device, and a controlling step of controlling the amount of the wavefront aberration by determining the first and the second driving voltages applied to the liquid crystal device based on the amount of the wavefront aberration predicted by the prediction step.

Here, the amount of the wavefront aberration generated in the liquid crystal device is predicted, and the driving voltages applied to the liquid crystal device are determined based on a prediction result so that the amount of the wavefront aberration generated when the optical beam is deflected is minimized. In this way, the wavefront aberration generated when the optical beam is deflected by the liquid crystal device is reduced, and as a result, degradation of the diameter of the spot of the optical beam is prevented.

According to another aspect of the embodiment, the amount of the wavefront aberration is predicted at the prediction step based on a temperature characteristic of a phase difference characteristic curve of the liquid crystal device, and a thermometry result of the liquid crystal device.

According to another aspect of the embodiment, the amount of the wavefront aberration is predicted at the prediction step based on the beam waist position of the optical beam on the scanned surface.

According to another aspect of the embodiment, the controlling step controls the reference voltage, which is a middle voltage between the first and the second driving voltages.

BRIEF DESCRIPTION OF THE DRAWINGS

FIG. 2 is a plan drawing seen from the +X side (at (A)), and an elevational drawing seen from the −Z side (at (B)) of a liquid crystal device 20a;

DESCRIPTION OF THE PREFERRED EMBODIMENTS

In the following, embodiments of the present invention are described with reference to the accompanying drawings.

First Embodiment

Figure 1:
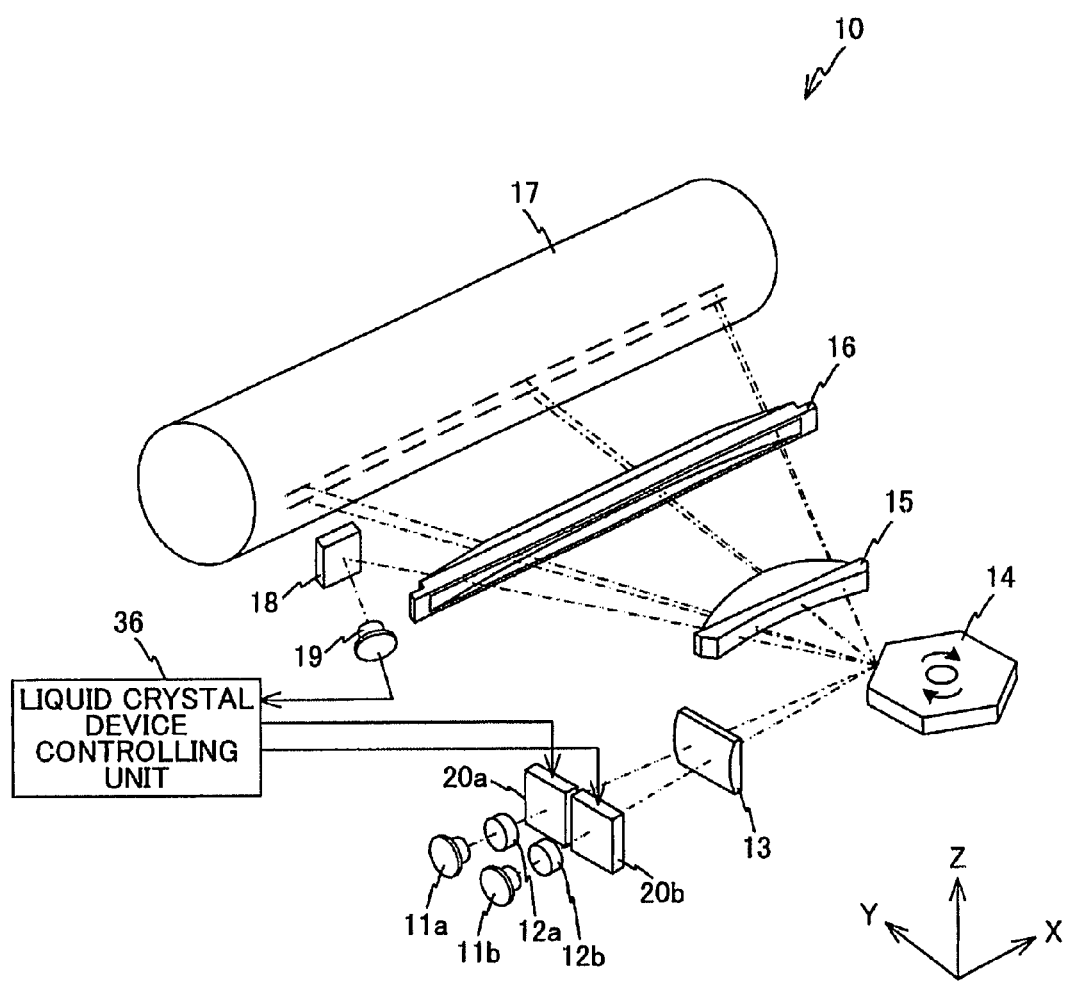
FIG. 1 is a perspective drawing showing an outline configuration of an optical scanning apparatus 10 according to the first embodiment of the present invention.

Hereafter, the first embodiment of the present invention is described with reference to FIGS. 1 through 8. FIG. 1 shows the outline of an optical scanning apparatus 10 according to the first embodiment.

The optical scanning apparatus 10 is described as using a multi-beam method with two optical beams, for example, wherein the optical beams are simultaneously scanned. The optical apparatus 10 includes a pair of semiconductor lasers 11a and 11b, a pair of coupling lenses 12a and 12b, a pair of liquid crystal devices 20a and 20b, a cylindrical lens 13, a polygon mirror 14, an fθ lens 15, a toroidal lens 16, a photo conductor drum 17 as a scanned surface, a reflective mirror 18, a beam pitch detection sensor 19, a liquid crystal device controlling unit 36, and a main control unit (not illustrated) for controlling the above-described functional units.

The semiconductor lasers 11a and 11b are of single mode. The semiconductor lasers 11a and 11b are adjacently arranged in Y-axis directions, and irradiate optical beams LBa and LBb, respectively, in the +X direction. The optical beams LBa and LBb are modulated according to predetermined image information by the main control unit (not illustrated).

The coupling lenses 12a and 12b are adjacently arranged in the Y-axis directions on the +X side of the semiconductor lasers 11a and 11b, respectively. The optical beams LBa and LBb irradiated by the semiconductor lasers 11a and 11b, respectively, are aligned into an approximately parallel light.

The liquid crystal devices 20a and 20b are adjacently arranged in the Y-axis directions on the +X side of the coupling lenses 12a and 12b, respectively. The liquid crystal devices 20a and 20b have the same purpose and the same function. Therefore, in the following, the liquid crystal device 20a is described as representing the liquid crystal devices.

Figure 2:
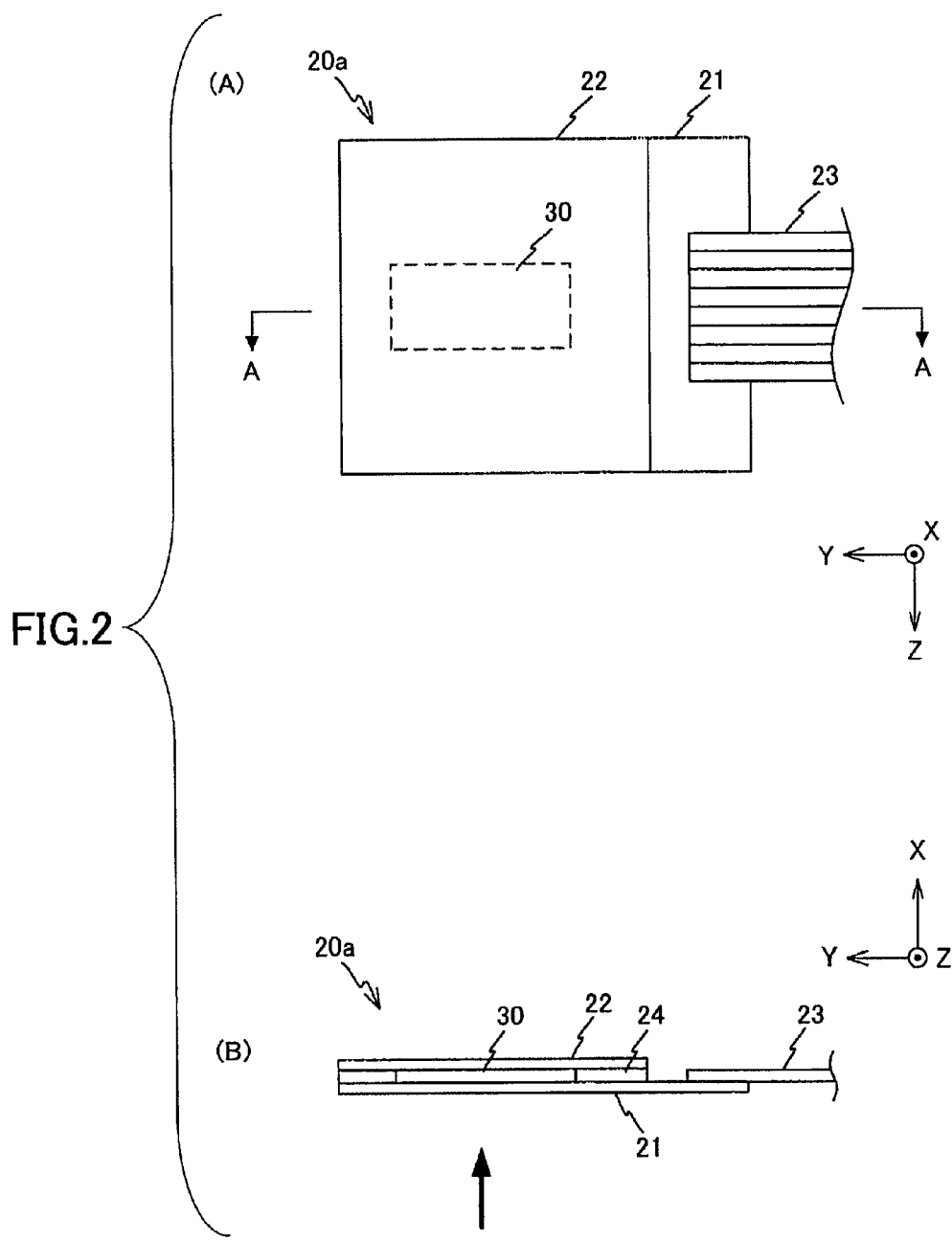

At (A) of FIG. 2, the liquid crystal device 20a as seen from the +X side is shown. At (B) of FIG. 2, the liquid crystal device 20a as seen from the +Z side is shown. As shown in FIG. 2, the liquid crystal device 20a includes a pair of glass substrates 21 and 22 that are arranged such that they mutually counter (form parallel planes spaced apart) in the direction of the X-axis with a predetermined spacing, a liquid crystal layer 30 sandwiched by the glass substrates 21 and 22, wherein longitudinal directions of the liquid crystal layer 30 are in the Y-axis directions, a resin layer 24 sandwiched by the glass substrates 21 and 22 and surrounding the liquid crystal layer 30, and a harness 23 for supplying a voltage signal to the liquid crystal layer 30.

Figure 3:
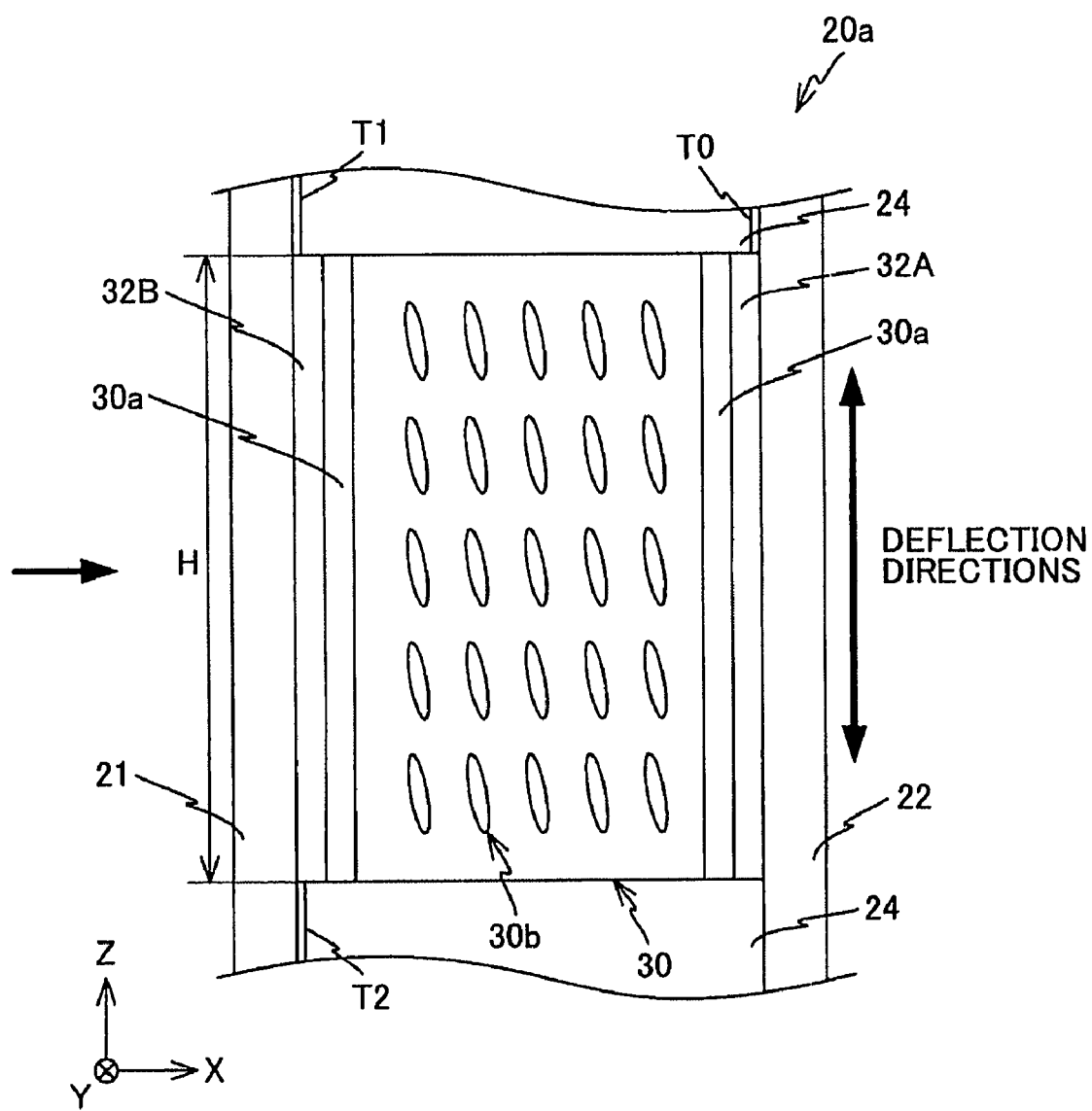
FIG. 3 is an enlarged elevational drawing (rotated 90 degrees) seen from the −Z side showing the vicinity of a liquid crystal layer 30.

FIG. 3 shows the liquid crystal layer 30 and its vicinity seen from the −Z side. The liquid crystal layer 30 has a width H (=2.0 mm) and a thickness of several to dozens of μm. As shown in FIG. 3, the liquid crystal layer 30 includes orientation films 30a formed at both edges in the Y-axis directions, and two or more liquid crystal molecules 30b. The liquid crystal layer 30 includes a transparent electrode 32A arranged on the −Y side of the orientation film 30a, and a striped transparent electrode 32B arranged on the +Y side of the other orientation film 30a. The liquid crystal layer 30 and other components described above are sandwiched by the pair of glass substrates 21 and 22.

Figure 4:
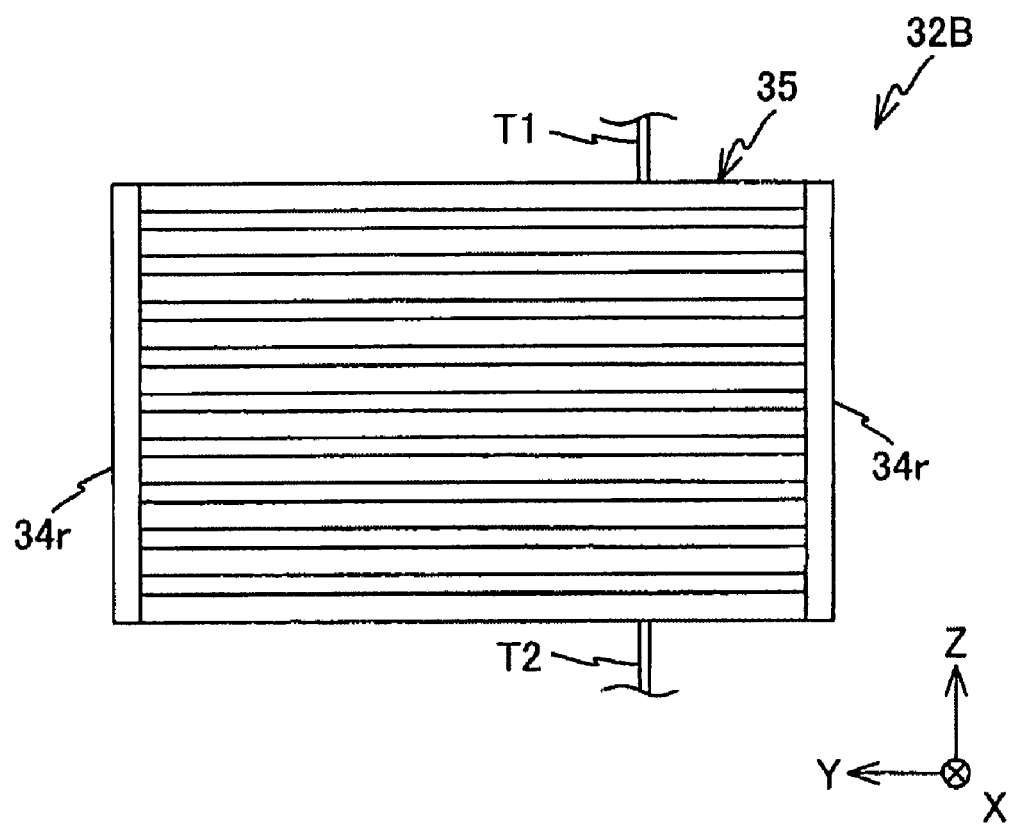
FIG. 4 is an enlarged elevational drawing seen from the −Z side showing a transparent electrode 32B.

FIG. 4 shows the striped transparent electrode 32B seen from the −X side. The striped transparent electrode 32B includes two or more transparent electrode components 35 that constitute an electrode pattern in the shape of stripes, wherein the transparent electrode components 35 are arranged at equal intervals in the Z-axis directions, and longitudinal directions of the transparent electrode components 35 are in the Y-axis directions. The transparent electrode 32A is a rectangular plate functioning as an electrode. Out of the transparent electrode components 35, one that is located the furthest in the +Z direction has a terminal T1 to which a driving voltage is provided by the liquid crystal device controlling unit 36; the other that is located the furthest in the −Z direction has a terminal T2. Ends on one side of the transparent electrode components 35 are electrically connected by a resistor 34r; and ends on the other side of the transparent electrode components 35 are electrically connected by another resistor 34r.

With reference to FIG. 1, the cylindrical lens 13 is arranged on the +X side of the liquid crystal devices 20a and 20b, and is arranged so that the generatrix of the cylindrical lens 13 may become parallel to the Y-axis. In this way, the optical beams LBa and LBb that penetrate through the liquid crystal devices 20a and 20b, respectively, are condensed onto a reflection surface of the polygon mirror 14.

The polygon mirror 14 is arranged on the +X side of the cylindrical lens 13. The polygon mirror 14 is shaped as an equilateral hexagon pillar with low height, and the reflection surfaces are formed on its six sides. The polygon mirror 14 is rotated at a fixed angular velocity centered on a perpendicular axle that is parallel to the Z-axis in the direction indicated by arrows shown in FIG. 1 by a rotating mechanism that is not illustrated. Accordingly, the optical beams LBa and LBb irradiated by the semiconductor lasers 11a and 11b, respectively, are condensed onto the reflection surfaces of the polygon mirror 14 by the cylindrical lens 13, are deflected by rotation of the polygon mirror 14 at the fixed angular velocity to be incident on the fθ lens 15.

The fθ lens 15 is arranged on the +Y side of the polygon mirror 14. The fθ lens 15 has an image height that is proportional to the angle of incidence of the optical beams LBa and LBb. In this way, the image surface of the optical beams LBa and LBb deflected by the polygon mirror 14 uniformly moves at the fixed angular velocity in the X-axis directions (the main scanning directions).

The toroidal lens 16 is arranged on the +Y side of the fθ lens 15, where the longitudinal directions of the toroidal lens 16 are in the X-axis directions. The toroidal lens 16 condenses the optical beams LBa and LBb that penetrate through the fθ lens 15 onto the surface of the photo conductor drum 17, and an image is formed.

The photo conductor drum 17 is arranged on the +Y side of the toroidal lens 16, where the longitudinal directions of the photo conductor drum 17 are in the X-axis directions. The photo conductor drum 17 is shaped like a cylinder, and is rotated centered on an axle that is parallel to the X-axis by a rotating mechanism (not illustrated). If a part of the surface of the photo conductor 17 is irradiated by the optical beams LBa and LBb, the part becomes conductive.

The reflective mirror 18 is arranged near an edge of the photo conductor drum 17 on the −X side, reflects the optical beams LBa and LBb that penetrate through the toroidal lens 16 to the beam pitch detection sensor 19.

The beam pitch detection sensor 19 is arranged on the optical path of the optical beams LBa and LBb reflected by the reflective mirror 18 at a position where the optical distance from the semiconductor lasers 11a and 11b to the beam pitch detection sensor 19 is equal to the optical distance between the semiconductor lasers 11a and 11b and the surface of the photo conductor drum 17. The beam pitch detection sensor 19 receives the optical beams LBa and LBb that are reflected by the reflective mirror 18, and generates electrical signals. The electrical signals include, for example, one that corresponds to a position of each beam spot of the optical beams LBa and LBb in the subscanning directions, and another that corresponds to a beam waist position error. The electrical signals are provided to the liquid crystal device controlling unit 36.

The liquid crystal device controlling unit 36 includes a storage unit for storing data about a phase difference characteristic curve (described below) of the liquid crystal devices 20a and 20b, a processing circuit for providing a driving voltage to the liquid crystal devices 20a and 20b based on the electrical signals from the beam pitch detection sensor 19 and the data stored in the storage unit, and a thermo sensor for detecting the temperature of the liquid crystal devices 20a and 20b.

Next, operations of the optical scanning apparatus 10 as configured above are described. As shown in FIG. 1, the optical beam LBa irradiated by the semiconductor laser 11a and the optical beam LBb irradiated by the semiconductor laser 11b penetrate the liquid crystal devices 20a and 20b, respectively; are made into an approximately parallel light by the coupling lenses 12a and 12b; and condensed to the reflection surface of the polygon mirror 14 by the cylindrical lens 13. Then, the optical beams LBa and LBb condensed to the reflection surface of the polygon mirror 14 are provided to the fθ lens 15, where the optical beams LBa and LBb are deflected with the predetermined angular velocity in the +X direction (the main scanning direction) of the photo conductor drum 17 by the rotation of the polygon mirror 14.

The optical beams LBa and LBb that are provided to the fθ lens 15 are transmitted to the toroidal lens 16, and are condensed onto the surface of the photo conductor drum 17 to form an image. Specifically, a latent image is formed by a first line scanned by the optical beam LBa and a second line scanned by the optical beam LBb; the first and the second lines are apart by a predetermined distance, and the latent image is formed on the surface of the photo conductor drum 17.

Prior to scanning the photo conductor drum 17, the liquid crystal device controlling unit 36 detects an error (line pitch) of beam spot positions of the optical beams LBa and LBb scanned on the photo conductor drum 17 based on the electrical signals from the beam pitch detection sensor 19, detects the temperatures of the liquid crystal devices 20a and 20b with thermo sensors (not illustrated), and controls the liquid crystal devices 20a and 20b based on detection results of the line pitch and the temperatures. Hereafter, the liquid crystal device 20a is taken up as a representative, and a method of deflecting the optical beam LBa is described.

The liquid crystal device controlling unit 36 calculates an error ΔZ that is a difference between the beam spot position of the optical beam LBa in the subscanning directions and a reference value such as a design value, and calculates a deflection angle β used as the target angle by which the optical beam LBa is to be deflected. Here, a focal distance of a cylindrical lens 13 is expressed by "fcyl", and a subscanning magnification of an optical system that includes the fθ lens 15 and the toroidal lens 16 after the polygon mirror 14 is expressed by "mz". Then, the relationship between the error ΔZ and the deflection angle β is expressed by the following formula (1), which can be reformed into the following formula (2).

$$\Delta Z = mz \times fcyl \times \tan \beta \quad (1)$$

$$\beta = \tan^{-1}(\Delta Z/(mz \times fcyl)) \quad (2)$$

The liquid crystal device controlling unit 36 obtains the error ΔZ of the optical beam LBa based on the signal provided by the beam pitch detection sensor 19, and then calculates the deflection angle β used as the target of deflecting the optical beam LBa based on the formula (2). Then, driving voltages E1 and E2 corresponding to the deflection angle β are applied to the terminals T1 and T2, respectively, of the liquid crystal device 20a. Hereafter, a control method of the driving voltages E1 and E2 is described.

The driving voltages E1 and E2 (E1<E2) are applied to the terminal T1 and the terminal T2, respectively, while a terminal T0 of the liquid crystal device 20a is grounded. The driving voltages E1 and E2 are rectangular wave-like signals at a frequency of several hundreds Hz to kHz. Then, an electric potential distribution is generated in the striped transparent electrode 32B as shown at (A) of FIG. 5. The liquid crystal molecules 30b are rotated in the directions so that their right sides go up and the rightmost molecules are rotated by the largest angle, as shown in (A) of FIG. 5.

Figure 5:
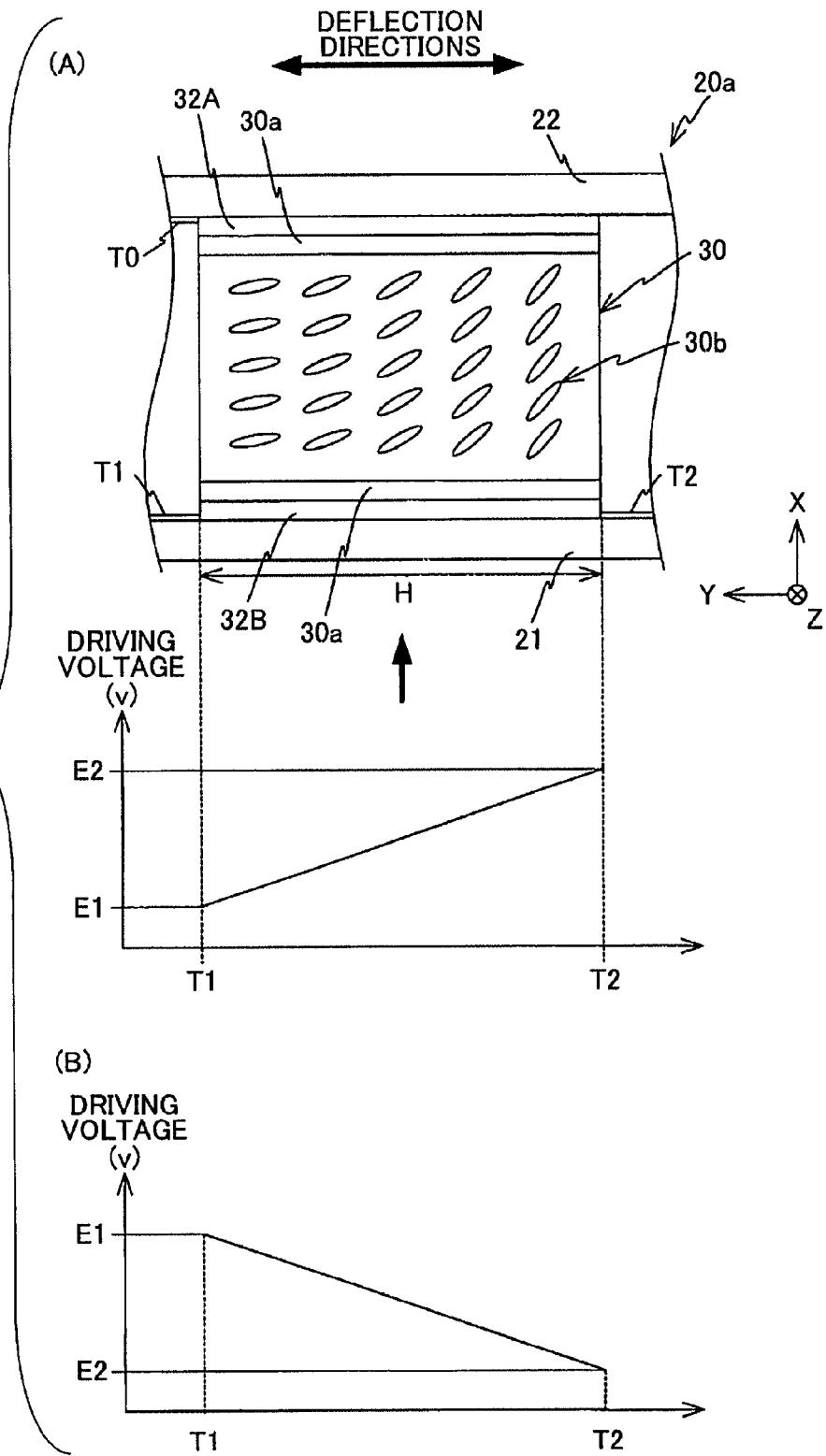
FIG. 5 is a drawing of the liquid crystal device 20a associated with a graph showing a driving voltage applied (at (A)), and another graph showing a driving voltage applied (at (B))

If the driving voltages E1 and E2 are applied to the terminals T1 and T2, respectively, as shown at (A) of FIG. 5, the electric potential generated in the striped transparent electrode 32B takes a linear incremental distribution that is proportional to the distance measured from T1 toward T2 with a constant value of the resistor 34r (refer to FIG. 4). An electric field having a magnitude according to the electric potential distribution is formed in the liquid crystal layer 30, and the liquid crystal molecules 30b of the liquid crystal layer 30 are rotated by angles according to the magnitude of the electric field as shown at (A) of FIG. 5.

In addition, the distance between the terminals T1 and T2 is referred to as "H".

Figure 6:
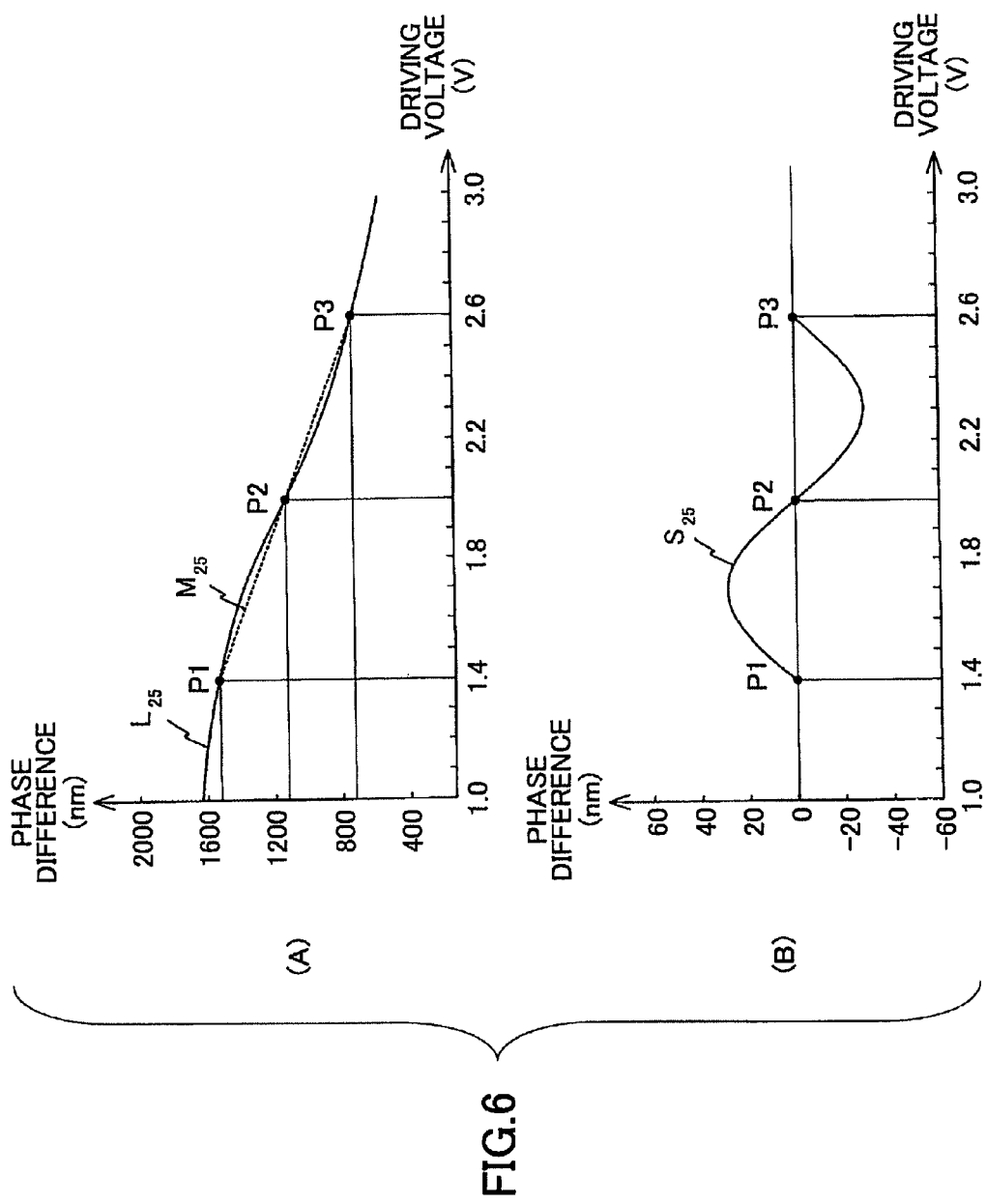
FIG. 6 is a graph showing a phase difference characteristic curve (at (A)) of the liquid crystal device 20a, and a graph showing a secondary component of the phase difference characteristic curve (at (B))

FIG. 6 at (A) shows a phase difference characteristic curve $L_{25}$ when the temperature of the liquid crystal layer 30 is 25° C. (base temperature). The phase difference characteristic curve $L_{25}$ shows that the phase difference becomes small as the driving voltage becomes great, which signifies that the optical distance in the direction of the X-axis of the liquid crystal layer 30 becomes small as the driving voltage becomes great. Therefore, when the electric potential distribution as shown in FIG. 5 (at (A)) is generated in the striped transparent electrode 32B, the optical distance in the direction of the X-axis becomes small as it goes from the terminal T1 to the terminal T2, and the optical beam LBa provided to the liquid crystal layer 30 is deflected toward the terminal T1.

Conversely, in the case that E1 is greater than E2 (E1>E1), the electric potential distribution produced in the striped transparent electrode 32B looks as shown at (B) of FIG. 5. The liquid crystal molecules 30b are rotated in the direction so that their left sides go down and the leftmost molecules are rotated by the largest angle. Then, the optical beam LBa provided to the liquid crystal layer 30 is deflected toward the terminal T2. Further, if the driving voltages E1 and E2 are equal (E1=E2), since no electric potential distribution is produced in the striped transparent electrode 32B, no electric field is generated in the liquid crystal layer 30; and the optical beam LBa penetrates through the liquid crystal device 20a without being deflected.

Here, a phase difference $\phi 1$ of the driving voltage E1, and a phase difference $\phi 2$ of the driving voltage E2 are used in reforming the formula (2) expressing the deflection angle $\beta$ into the following formula (3), and further into the following formula (4). Here, $\Delta\phi 12$ represents a difference between the phase difference $\phi 1$ and the phase difference $\phi 2$.

$$\beta = \tan^{-1}((\phi 1 - \phi 2)/H) \quad (3)$$
$$= \tan^{-1}(\Delta\phi 12/H)$$

$$\Delta\phi 12 = H \times \tan\beta \quad (4)$$

That is, the liquid crystal device controlling unit 36 calculates the deflection angle $\beta$, calculates the difference $\Delta\phi 12$ between the phase differences $\phi 1$ and $\phi 2$ based on the formula (4), and determines the driving voltages E1 and E2 based on the value of $\Delta\phi 12$. With the calculated voltages E1 and E2, the optical beam LBa is deflected by the deflection angle $\beta$. In the following, a method of determining the driving voltages E1 and E2 is described with reference to FIG. 6.

If it is only to deflect the optical beam LBa by the deflection angle $\beta$, the relationship between $\beta$ and $\Delta\phi 12$ of the formula (4) should just suffice. However, the phase difference characteristic curve $L_{25}$ contains high order components (such as a secondary component) other than a linear component. For this reason, it is desirable to determine the driving voltages E1 and E2 based on a comparatively linear part of the phase difference characteristic curve $L_{25}$.

In the case of the phase difference characteristic curve $L_{25}$, the characteristic is approximately symmetric in a range of the driving voltages between 1.4 V and 2.6 V, centered on a point P2 that corresponds to a voltage 2.0 V. A straight line $M_{25}$ is drawn from a point P1 that corresponds to 1.4 V to a point P3 that corresponds to 2.6 V. The difference between the phase difference characteristic curve $L_{25}$ and the straight line $M_{25}$ gives a curve $S_{25}$ of the phase difference characteristic curve $L_{25}$ in the range between the driving voltages 1.4V and 2.6V, which curve $S_{25}$ is shown at (B) of FIG. 6. The curve $S_{25}$ is equivalent to the power component generated in the liquid crystal device 20a, where the power component may cause an increase in divergence of the optical beam LBa that penetrates through the liquid crystal device 20a. The phase difference characteristic curve $L_{25}$ contains the second and more order components. The second order component of the curve $S_{25}$ corresponds to the power component of the wavefront aberration. Then, since the curve $S_{25}$ is approximately symmetric centered at the point P2, the driving voltage 2.0 V corresponding to the point P2 is made into a middle voltage, and the driving voltages E1 and E2 are determined based on the middle voltage. In this way, an average value of the secondary component shown by the curve $S_{25}$ specified by the points corresponding to the driving voltages E1 and E2 can be made approximately 0.

Specifically, the liquid crystal device controlling unit 36 defines a reference voltage E0 corresponding to the point P2, i.e., 2.0V. Then, the driving voltages E1 and E2 are controlled centered on the reference voltage E0. That is, the driving voltage E1 is defined as E0−ΔE, and the driving voltage E2 is defined as E0+ΔE, where the value of ΔE is made to fluctuate. In this way, the average value of the secondary component of the phase difference characteristic curve $L_{25}$ at the driving voltages E1 and E2 can be maintained at nearly 0, and the power component that acts when the optical beam LBa is deflected can be minimized.

Now, the form (shape) of the phase difference characteristic curve does not change with changes of the temperature of the liquid crystal device 20a; however, a characteristic relative to the driving voltage changes. For example, if the driving voltages E1 and E2 are determined based on the reference voltage E0 at the base temperature (25° C.), which reference voltage is called $E0_{25}$, the wavefront aberration at the time of deflecting the optical beam LBa may become great at different temperatures. For this reason, when the temperature of the liquid crystal device 20a changes, it is necessary to appropriately control the reference voltage E0 according to the temperature of the liquid crystal device 20a. Hereafter, a method of modulating the liquid crystal device 20a is described wherein the reference voltage E0 is controlled.

Figure 7:
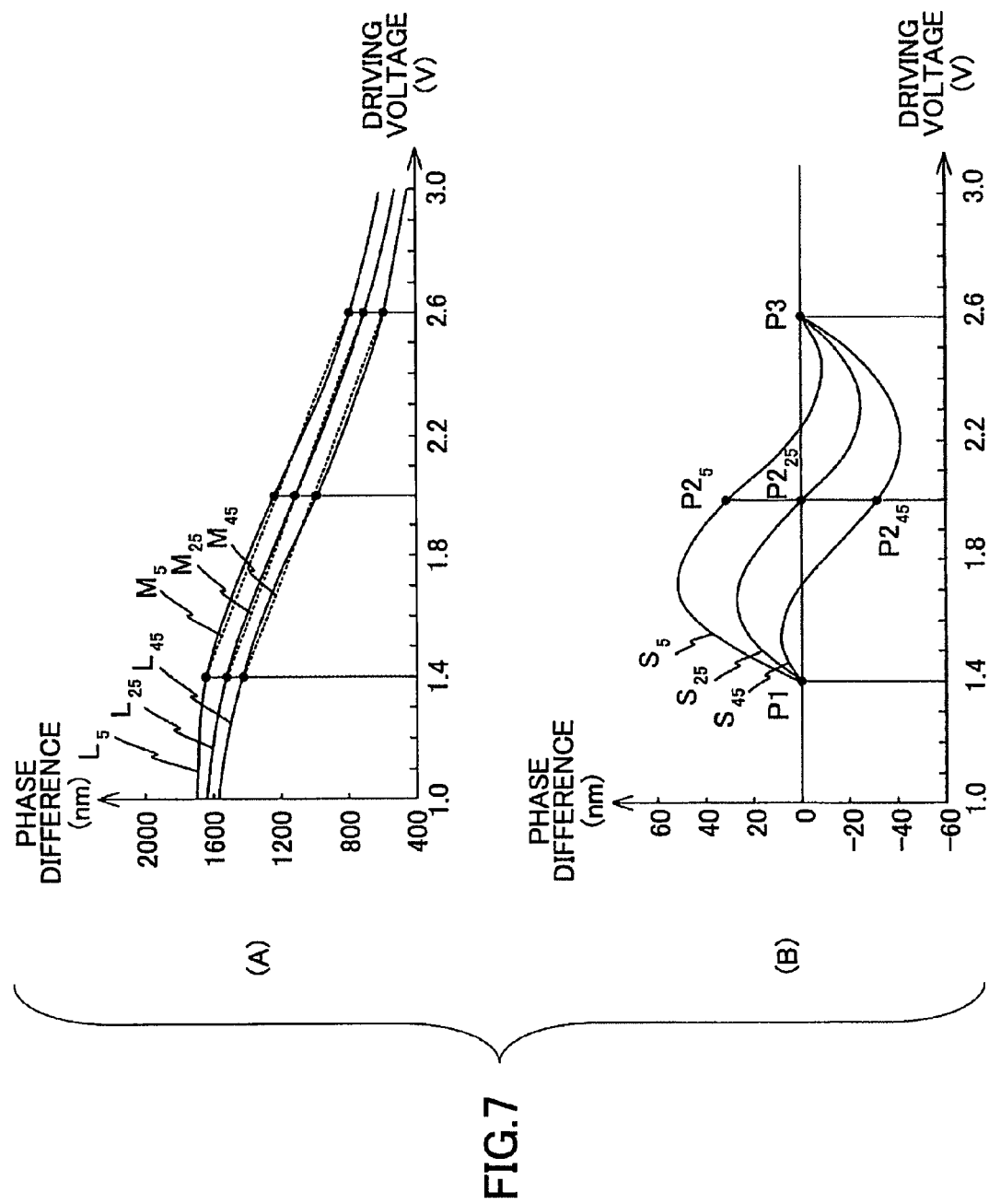
FIG. 7 is a graph showing temperature dependability of the phase difference characteristic curve (at (A)), and a graph showing a characteristic of the secondary component at varied temperatures (at (B))

FIG. 7, at (A), shows phase difference characteristic curves $L_5$ and $L_{45}$ at temperatures 5° C. and 45° C., respectively, of the liquid crystal device 20a, in addition to the phase difference characteristic curve $L_{25}$ at the base temperature 25° C. As illustrated here, the phase difference characteristic curve $L_5$ is almost the same as the phase difference characteristic curve $L_{25}$ parallel shifted rightward; and the phase difference characteristic curve $L_{45}$ is the same as the phase difference characteristic curve $L_{25}$ parallel shifted leftward. Then, straight lines $M_5$ and $M_{45}$ are drawn between points corresponding to 1.4 V and 2.6 V. The straight lines $M_5$ and $M_{45}$ have almost the same slope as the straight line $M_{25}$; however they are vertically shifted with reference to the straight line $M_{25}$.

Here, since the slopes of the straight lines $M_5$, $M_{25}$, and $M_{45}$ are almost the same, the deflection angle $\beta$ of the optical beam LBa may be practically obtained disregarding the differences. However, as shown at (B) of FIG. 7, a curve $S_5$ showing the secondary component of the phase difference characteristic curve $L_5$ at temperature 5° C. has a greater positive integral area than a negative integral area in the range between 1.4 V and 2.6 V; and a curve $S_{45}$ showing the secondary component of the phase difference characteristic curve $L_{45}$ at temperature 45° C. has a greater negative integral area than a positive integral area in the range between 1.4 V and 2.6 V. That is, forward power is generated when driving if the temperature of the liquid crystal device 20a is 5° C. and negative power is generated when driving if the temperature of the liquid crystal device 20a is 45° C. Therefore, if the optical beam LBa is deflected based on the reference voltage $E0_{25}$ (=2.0V) regardless of actual temperature, the wavefront aberration is generated.

Then, in order to reduce the power component generated when deflecting the optical beam LBa, the liquid crystal device controlling unit 36 adjusts the reference voltage E0 to a voltage that approximately corresponds to a symmetric point (a point of symmetry) of each phase difference characteristic curve of different temperatures. Based on such adjusted E0, the driving voltage E1 applied to the terminal T1 is determined as E0−ΔE, and the driving voltage E2 applied to the terminal T2 is determined as E0+ΔE.

Figure 8:
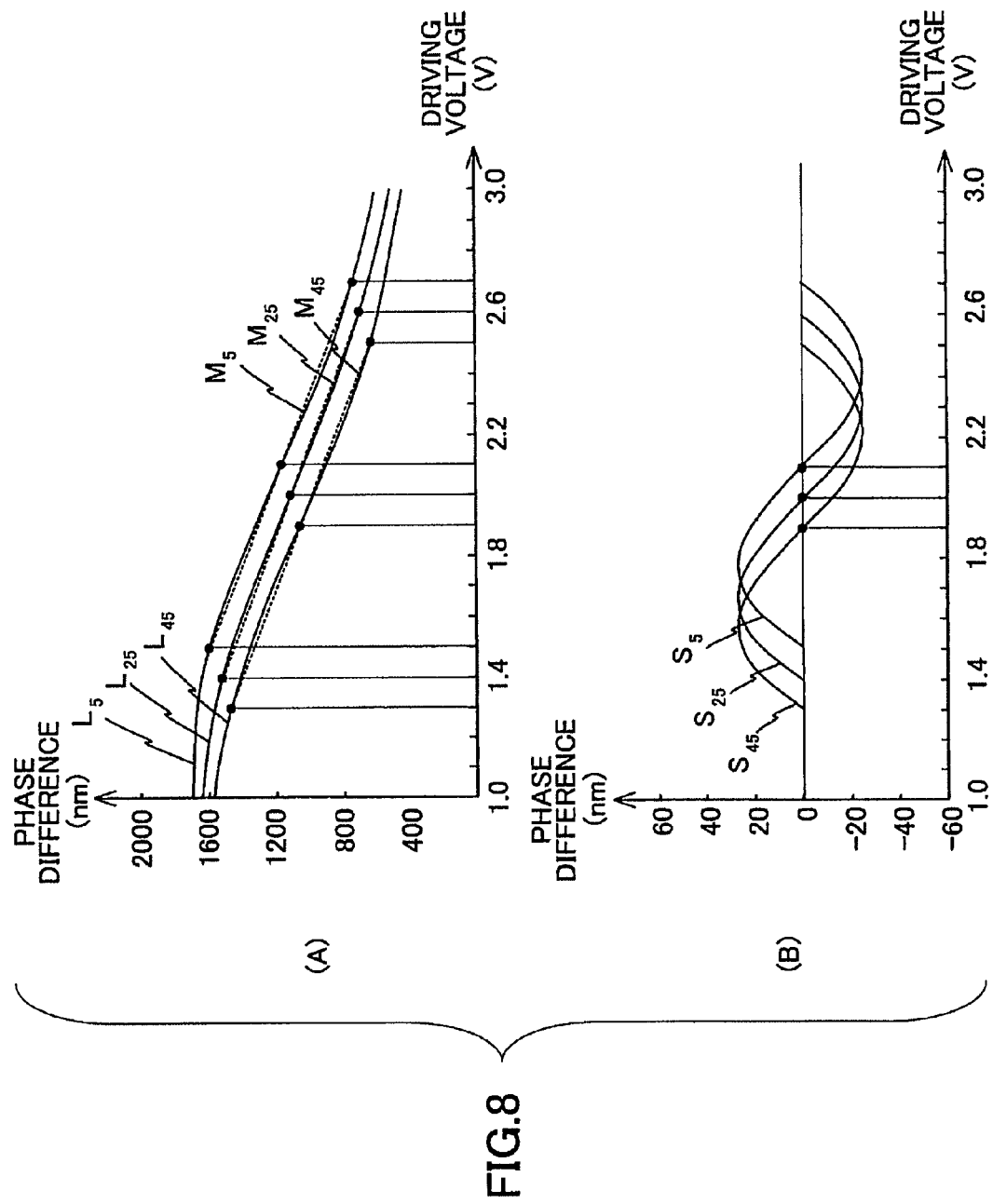
FIG. 8 contains graphs for explaining a control method of a reference voltage.

For example, as shown in FIG. 8 at (A), if the temperature of the liquid crystal device 20a is 45° C., the reference voltage E0 is set to 1.9 V corresponding to the symmetric point of the phase difference characteristic curve $L_{45}$; and if the temperature of the liquid crystal device 20a is 5° C., the reference voltage E0 is set to 2.1 V corresponding to the symmetric point of the phase difference characteristic curve $L_5$. In this way, the curve $S_{45}$ showing the secondary component of the phase difference characteristic curve $L_{45}$ in a range from driving voltage 1.3 V to 2.5 V, and the curve $S_5$ showing the secondary component of the phase difference characteristic curve $L_5$ in a range from voltage 1.5 V to 2.7 V are made symmetric (ref. FIG. 8 at (B)) with reference to the corresponding symmetric point representing the reference voltage E0 in each temperature, and generating the power component in the liquid crystal device 20a is avoided.

As described above, according to the optical scanning apparatus 10 of the present embodiment, the liquid crystal device controlling unit 36 calculates the deflection angle $\beta$ that serves as the compensation target of the optical beams LBa and LBb, detects the temperatures of the liquid crystal devices 20a and 20b, increases the reference voltage E0 if the temperature of the liquid crystal devices 20a and 20b is lower than the base temperature, and decreases the reference voltage E0 if the temperature of the liquid crystal devices 20a and 20b is higher than the base temperature, such that the secondary component in the range specified by the points corresponding to the driving voltage E1 and the driving voltage E2 of the phase difference characteristic curve at the detected temperature become approximately point symmetric at the reference voltage E0.

In this way, the power component generated in the liquid crystal devices 20a and 20b when deflecting the optical beams LBa and LBb is reduced practically to zero as a whole; and the degradation of the diameter of the spots produced when the optical beams LBa and LBb are deflected is reduced as a result.

Further, controlling the reference voltage in connection with the temperature change of the liquid crystal devices 20a and 20b can be carried out by only slightly changing an algorithm of an input voltage, that is, no special components are required. Therefore, the dimensions and the cost of the apparatus are not increased.

In addition, the phase difference characteristic curve of liquid crystal devices is peculiar to each liquid crystal device, that is, there is an individual difference from device to device. Accordingly, it is possible to beforehand measure the temperature dependence of the phase difference characteristic curve for every liquid crystal device, and store results in the liquid crystal device controlling unit 36. For example, information that associates temperatures and reference voltages of a liquid crystal device may be stored. When the liquid crystal devices 20a and 20b are to be driven, the reference voltage E0 is determined based on the information about the temperatures of the detected liquid crystal devices 20a and 20b, and the driving voltages E1 and E2 are determined based on the reference voltage E0. In this way, the power components generated in the liquid crystal devices 20a and 20b are efficiently and quickly minimized.

Further, even if the temperatures of the liquid crystal devices 20a and 20b are the same, there are cases wherein the amount of the wavefront aberration is great if the target deflection angle $\beta$ is great. An example is shown at (A) of FIG. 9 wherein the reference voltage E0 is 2.0 V, and $\Delta E$ is +1.0 V; accordingly the driving voltage E1 is 1.0 V, and the driving voltage E2 is 3.0 V. Then, the phase difference $\phi 1$ at the driving voltage E1 is 1612 nm, and the phase difference $\phi 2$ at the driving voltage E2 is 529 nm. In this case, the deflection angle $\beta$ of the liquid crystal devices 20a and 20b is obtained by the formula (3), namely:

$$\beta = \tan^{-1}(\Delta \phi 12/H)$$
$$= \tan^{-1}(1083 \text{ [nm]}/2.0 \text{ [mm]})$$
$$= 1.9 \text{ [minutes]}$$

Figure 9:
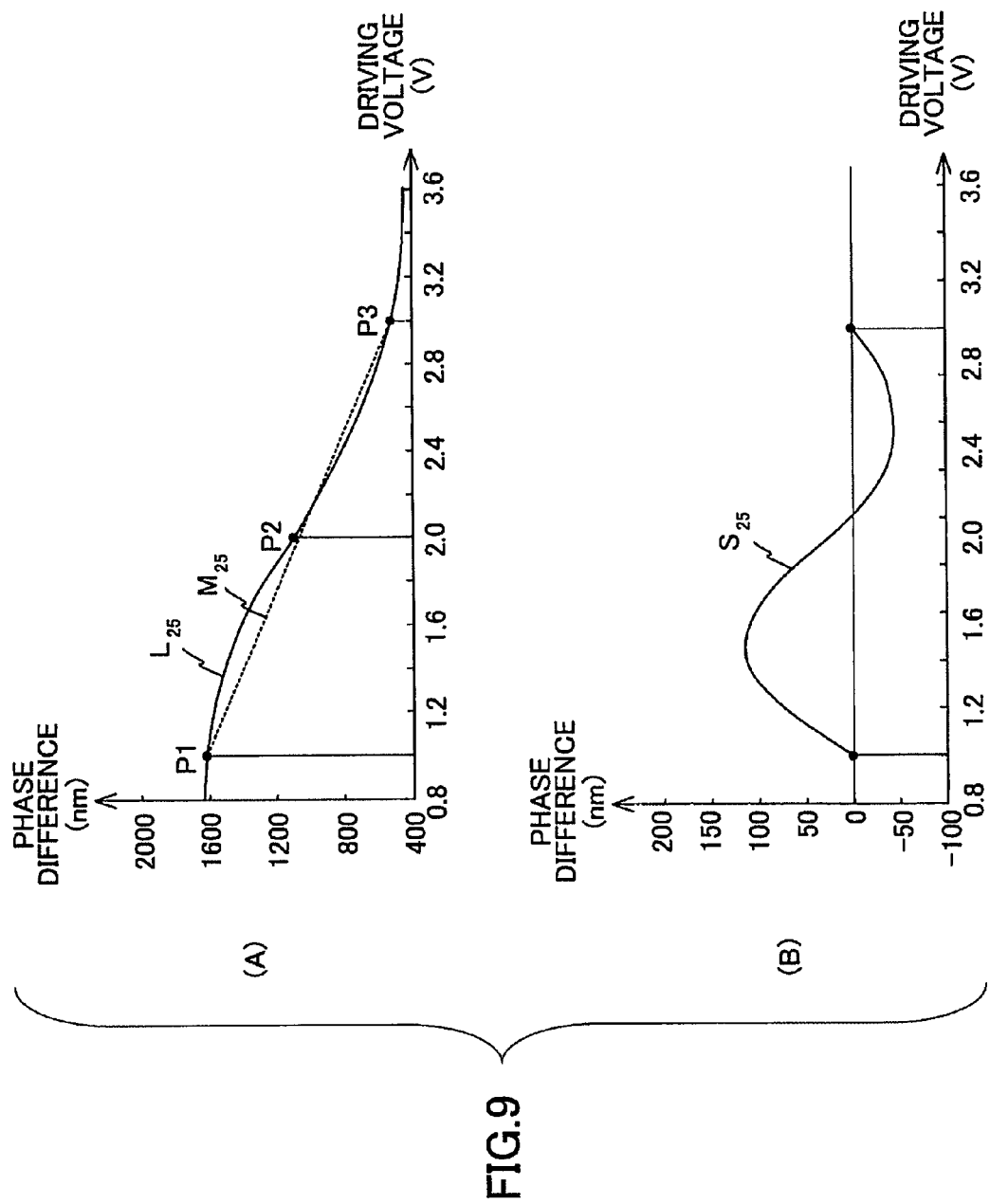
FIG. 9 contains graphs for explaining the control approach of the reference voltage.

At this time, the curve $S_{25}$ with the secondary component of the phase difference characteristic curve $L_{25}$ in the range between the driving voltages E1 and E2 becomes as shown at (B) of FIG. 9. As shown here, the curve $S_{25}$ has a greater positive integral area than a negative integral area. That is, when the optical beams LBa and LBb are deflected, forward power is generated. As described above, if the deflection angle $\beta$ is made to differ fixing the reference voltage E0 under the same temperature condition, depending on the magnitude of the deflection angle $\beta$, the power component of the liquid crystal devices 20a and 20b may increase. As a result, the amount of the wavefront aberration of the optical beams LBa and LBb may remarkably increase.

Figure 10:
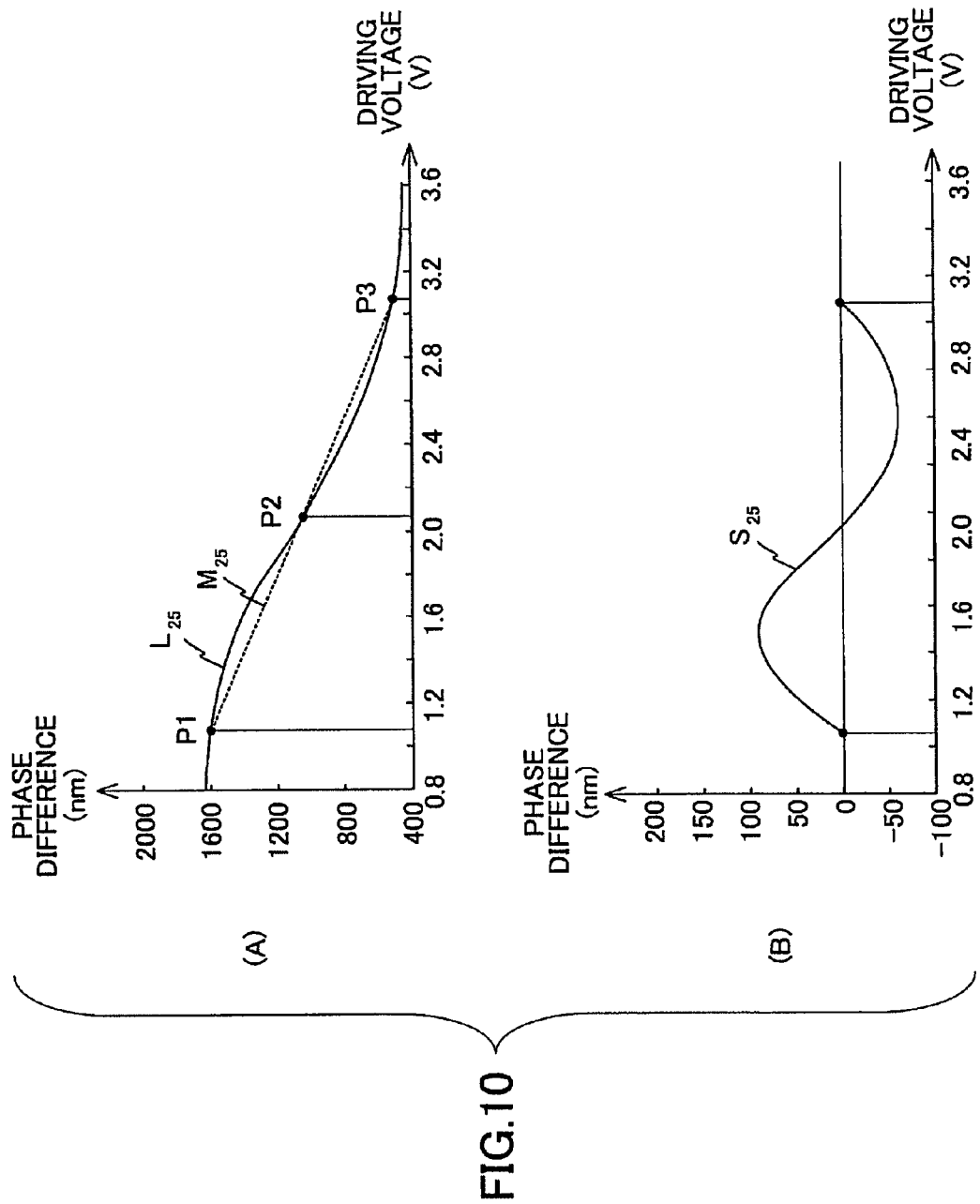
FIG. 10 contains graphs showing results of the control of the reference voltage.

In order to reduce the amount of the wavefront aberration, the reference voltage E0 is adjusted based on the deflection angle $\beta$. For example, if the reference voltage E0 is adjusted to 2.07 V, the driving voltages E1 and E2 become 1.07 V and 3.07 V, respectively, as shown at (A) of FIG. 10. As a result, the curve $S_{25}$ with the secondary component in the range of the driving voltages between E1 and E2 becomes as shown at (B) of FIG. 10, wherein the curve $S_{25}$ becomes approximately symmetrically centered on a point corresponding to the reference voltage E0, that is, the magnitude of the power component is effectively minimized. In this case, since the phase difference $\phi 1$ at the driving voltage E1 is 1600 nm, and the phase difference $\phi 2$ at the driving voltage E2 is 508 nm, the difference $\Delta \phi 12$ between the phase differences is 1092 (=1600−508) nm. Since this difference $\Delta \phi 12$ is within about 0.8% of the value (1083 nm) before controlling the driving voltage E0, it is a satisfactory level in practical uses. Therefore, as described above, even if the temperatures of the liquid crystal devices 20a and 20b are the same, the reference voltage E0 may be adjusted according to the target deflection angle $\beta$ so that the amount of the wavefront aberration may be minimized, and the degradation of the diameter of the spots of the optical beams LBa and LBb may be minimized.

Figure 11:
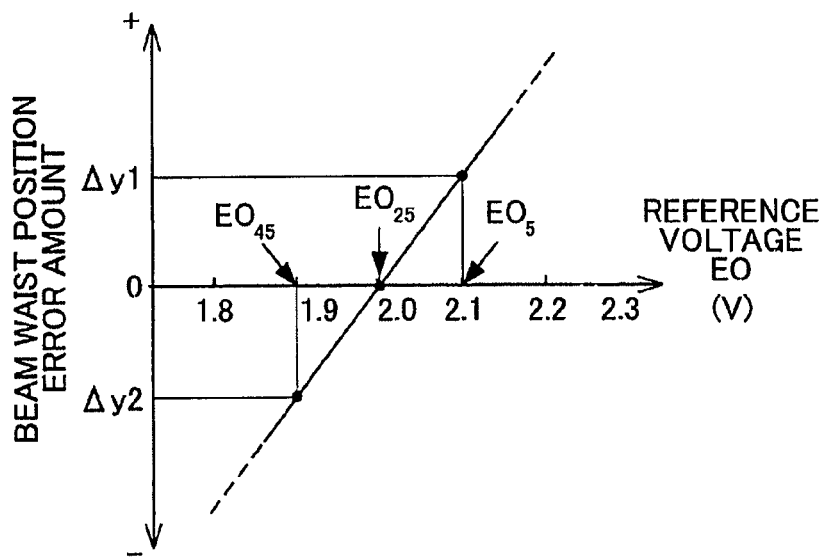
FIG. 11 is a graph showing a relationship between the reference voltage and beam waist position error.

Further, as shown at (B) of FIG. 7, the liquid crystal devices 20a and 20b generate forward power at the low temperature, and generate negative power at the high temperature. Accordingly, it is desired that the temperature characteristic of an optical system be such that the beam waist position is moved in a direction separating from the luminous source at the low temperature, and is moved in a direction that brings the beam waist position close to the luminous source at the high temperature. Here, an example of the optical system includes the coupling lenses 12a and 12b, the cylindrical lens 13, the toroidal lens 16, and the liquid crystal devices 20a and 20b when not driven (expanded or shrunken due to temperature variation) shown in FIG. 1. Relationships between amounts of beam waist position movements generated when deflecting the liquid crystal device 20a and the different reference voltages $E0_5$ (=2.1 V), $E0_{25}$ (=2.0 V), and $E0_{45}$ (=1.9 V) in an environment wherein the temperature of the liquid crystal device 20a is held at 25° C. are given in FIG. 11. As shown here, the amount of the beam waist position movement is on the positive side if the reference voltage E0 is shifted from $E0_{25}$ (=2.0 V) to $E0_5$ (=2.1 V), and the amount is on the negative side if the reference voltage is shifted from $E0_{25}$ (=2.0 V) to $E0_{45}$ (=1.9 V). Therefore, if the optical system has a characteristic such as the beam waist position is moved to the positive side by Δy1 when the temperature of the liquid crystal device falls to 5° C. from 25° C., and the beam waist position is moved to the negative side by Δy2 when the temperature of the liquid crystal device rises to 45° C. from 25° C., the reference voltage E0 does not have to be changed. That is, the amount of the wavefront aberration, and therefore, degradation of the diameter of the spot of the optical beam can be minimized with a fixed reference voltage. Here, it is not necessary for the optical system to accurately move the beam waist position by Δy1 and Δy2, but it is sufficient if the optical system is capable of generating negative refractive power in a direction that negates the refractive power generated in the liquid crystal devices 20a and 20b, the magnitude of which negative refractive power is made into a level that does not excessively compensate for the refractive power generated in the liquid crystal devices 20a and 20b.

Figure 12:
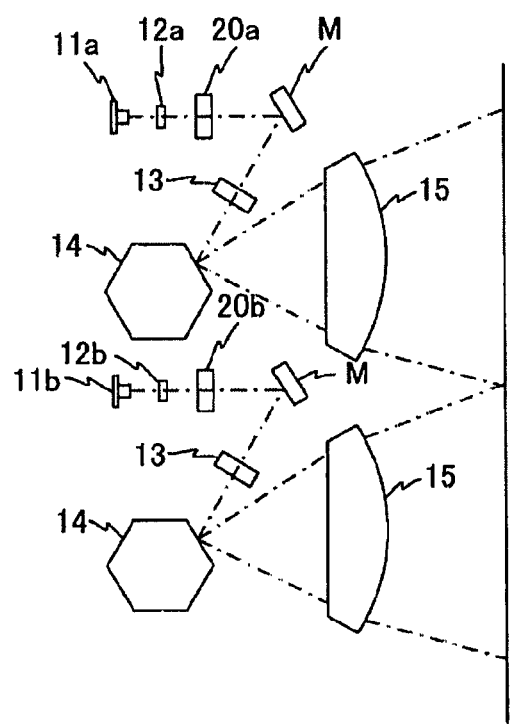
FIG. 12 is a schematic drawing showing a modification of the optical scanning apparatus 10.

Further, although the embodiment has described the case wherein the photo conductor drum 17 is scanned by one polygon mirror 14, the configuration is not limited to this. But, other configurations are possible, for example, two polygon mirrors 14 may be arranged in parallel in the main scanning direction, each of the polygon mirrors 14 scanning corresponding dedicated portions of the photo conductor drum 17 as shown in FIG. 12. Thus, by dividing the surface of the photo conductor drum 17, effective writing width of the surface can be increased. In other words, if the same effective writing width is considered, optical components such as the deflection components (liquid crystal devices 20a and 20b) can be miniaturized, which decreases fluctuation of the beam waist position due to mechanism tolerance and temperature, and the wavefront aberration is reduced and a high-quality image is acquired as a result.

In addition, although the embodiment has described the case wherein the optical beams LBa and LBb are deflected in the subscanning directions using the liquid crystal devices 20a and 20b, this is not the only possible implementation. But, orientation of the liquid crystal devices 20a and 20b may be changed so that the optical beams LBa and LBb are deflected to be incident in the main scanning directions, and the beam spot position is adjusted.

Second Embodiment

The second embodiment of the present invention is described below with reference to FIG. 13 and FIG. 14. Components that are the same as or equivalent to the first embodiment bear the same reference codes, and descriptions thereof may not be repeated.

Figure 13:
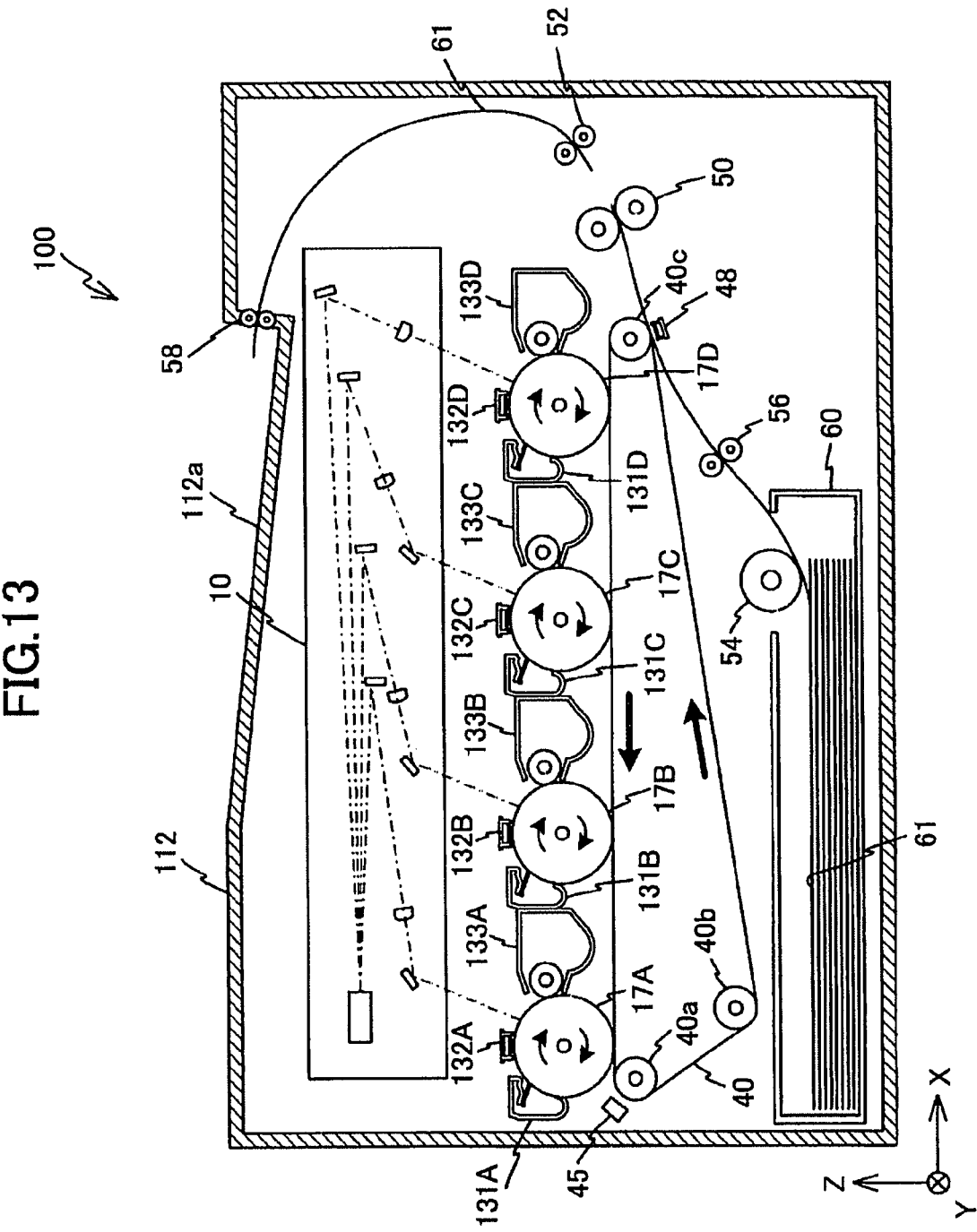
FIG. 13 is a cutout drawing showing an image formation apparatus 100 according to the embodiment of the present invention.

FIG. 13 shows the outline configuration of an image formation apparatus 100 according to the second embodiment.

The image formation apparatus 100 is a tandem type color printer for printing a multi-color image by transferring and superposing toner images in black, yellow, magenta, and cyan colors onto a printing medium such as paper, using the Carlson process. The image formation apparatus 100 includes an optical scanning apparatus 10, four photo conductor drums 17A, 17B, 17C, and 17D, a transfer belt 40, a position error detecting unit 45, a paper feed tray 60, a feed roller 54, a first resist roller pair 56, a second resist roller pair 52, a fixing roller 50, a delivery roller 58, and a housing 112 for accommodating the components described above.

Further, a delivery tray 112a for receiving the paper on which printing has been processed is arranged on the housing 112; and the optical scanning apparatus 10 is arranged under the delivery tray 112a.

The optical scanning apparatus 10 scans the surface of the photo conductor drum 17A with an optical beam corresponding to a black image component, scans the photo conductor drum 17B with an optical beam corresponding to a cyan image component, scans the photo conductor drum 17C with an optical beam corresponding to a magenta image component, and scans the photo conductor drum 17D with an optical beam corresponding to a yellow image component. The optical beams corresponding to the colors are modulated based on image information provided by a higher rank apparatus (such as a personal computer).

Each of the four photo conductor drums 17A, 17B, 17C, and 17D is shaped like a cylinder, and has a surface functioning as a sensitization layer. When the optical beam is irradiated to a part of the sensitization layer, the part is charged. The photo conductor drums 17A, 17B, 17C, and 17D are arranged at equal intervals in the directions of the X-axis under the optical scanning apparatus 10.

The photo conductor drum 17A is arranged with its longitudinal directions in the Y-axis directions at a −X side edge of the housing 112, and is rotationally driven by a rotating mechanism (not illustrated) in the clockwise direction (direction shown by arrows in FIG. 13). Around the photo conductor drum 17A are arranged an electrification charger 132A at a 12 o'clock position (top), a toner cartridge 133A at a 2 o'clock position, and a cleaning case 131A at a 10 o'clock position.

The electrification charger 132A is arranged with its longitudinal directions in the Y-axis directions taking a predetermined clearance to the surface of the photo conductor drum 17A, and electrifies (charges) the surface of the photo conductor drum 17A with a predetermined voltage.

The toner cartridge 133A includes a cartridge that contains black toner, and a developing roller charged with a voltage of a polarity reversed to that of the photo conductor drum 17A. The toner in the cartridge body is supplied to the surface of the photo conductor drum 17A through the developing roller.

The cleaning case 131A includes a cleaning blade in the shape of a rectangle that is arranged with its longitudinal directions in the Y-axis directions such that the end of the cleaning blade may touch the surface of the photo conductor drum 17A. The toner remaining on the surface of the photo conductor drum 17A is removed by the cleaning blade with rotation of the photo conductor drum 17A, and is collected inside the cleaning case 131A.

The photo conductor drum 17B is arranged on the +X side of the photo conductor drum 17A with the predetermined interval, and is rotated by a rotating mechanism (not illustrated) in the clockwise direction (direction shown by the arrows) in FIG. 13. An electrification charger 132B, a toner-cartridge 133B, and a cleaning case 131B are arranged around the photo conductor drum 17B similar to the corresponding components in the case of the photo conductor drum 17A.

The electrification charger 132B is arranged like the electrification charger 132A, and electrifies the surface of the photo conductor drum 17B at the predetermined voltage.

The toner-cartridge 133B includes a cartridge body containing cyan toner, and a developing roller charged with a voltage of a polarity that is reverse to the voltage of the photo conductor drum 17B, and the toner in the cartridge body is supplied to the surface of the photo conductor drum 17B through the developing roller.

The cleaning case 131B is constituted like the cleaning case 131A, and functions similarly.

The photo conductor drum 17C is arranged on the +X side of the photo conductor drum 17B with the predetermined interval, and is rotated through a rotating mechanism (not illustrated) in the clockwise direction (direction shown by arrows) in FIG. 13. An electrification charger 132C, a toner-cartridge 133C, and a cleaning case 131C are arranged around the photo conductor drum 17C at the same relative positions as the components around the photo conductor drum 17A.

The electrification charger 132C is constituted like the electrification charger 132A, and electrifies the surface of the photo conductor drum 17C with the predetermined voltage.

The toner-cartridge 133C includes a cartridge body that contains magenta toner, and a developing roller charged with a voltage of a polarity reversed to the photo conductor drum 17C. The toner in the cartridge body is supplied to the surface of the photo conductor drum 17C through the developing roller.

The cleaning case 131C is constituted like the cleaning case 131A, and functions similarly.

The photo conductor drum 17D is arranged on the +X side of the photo conductor drum 17C at the predetermined interval, and is rotated by a rotating mechanism (not illustrated) in the clockwise direction (direction shown by arrows) in FIG. 13. An electrification charger 132D, a toner-cartridge 133D, and a cleaning case 131D are arranged around the photo conductor drum 17D at the same relative positions as the components around the photo conductor drum 17A.

The electrification charger 132D is constituted like the electrification charger 132A, and electrifies the surface of the photo conductor drum 17D with the predetermined voltage.

The toner-cartridge 133D includes a cartridge body containing yellow toner, and a developing roller charged with a voltage of a polarity reverse to the photo conductor drum 17D, and the toner is supplied to the surface of the photo conductor drum 17D through the developing roller.

The cleaning case 131D is constituted like the cleaning case 131A, and functions similarly.

In the following, the photo conductor drum 17A, the electrification charger 132A, the toner-cartridge 133A, and the cleaning case 131A are collectively referred to as the first station. Similarly, the photo conductor drum 17B, the electrification charger 132B, the toner-cartridge 133B, and the cleaning case 131B are collectively referred to as the second station; the photo conductor drum 17C, the electrification charger 132C, the toner-cartridge 133C, and the cleaning case 131C are collectively referred to as the third station; and the photo conductor drum 17D, the electrification charger 132D, the toner-cartridge 133D, and the cleaning case 131D are collectively referred to as the fourth station.

The transfer belt 40 is an endless belt, and is wound around a follower roller 40a arranged under the photo conductor drum 17A, another follower roller 40c arranged under the photo conductor drum 17D, and a drive roller 40b arranged at a position lower than the follower rollers 40a and 40c. Here, the upper surface of the transfer belt 40 touches the lower surfaces of the photo conductor drums 17A, 17B, 17C, and 17D. The transfer belt 40 is rotated counterclockwise (direction shown by arrows in FIG. 13) by the drive roller 40b rotating counter-clockwise. Further, near at the +X side edge of the transfer belt 40, a transfer charger 48 is provided; and a voltage of a polarity that is reverse to the electrification chargers 132A, 132B, 132C, and 132D is applied to the transfer charger 48.

The position error detecting unit 45 is arranged on the −X side of the transfer belt 40. With reference to FIGS. 13 and 14, the position error detecting unit 45 includes a light emitting diode (LED) 42a for illuminating the +Y side edge of the transfer belt 40, a photo sensor 41a for receiving a light reflected by the transfer belt 40, a LED 42b for illuminating a center section of the transfer belt 40, a photo sensor 41b for receiving the light reflected by the transfer belt 40, a LED 42c for illuminating the −Y side edge of the transfer belt 40, and a photo sensor 41c for receiving the light reflected by the transfer belt 40. Here, FIG. 14 is a perspective view showing components in the housing 112.

Figure 14:
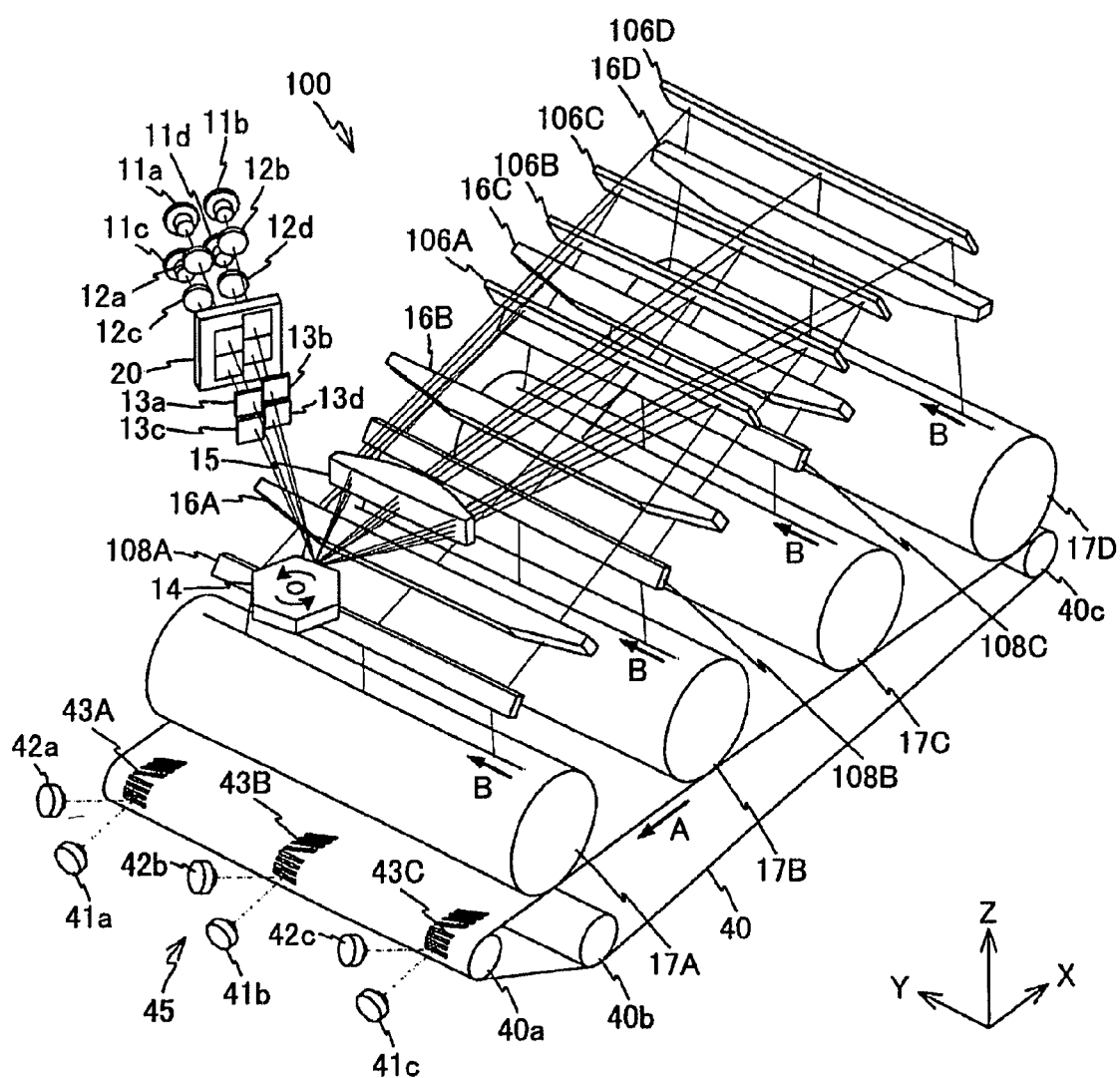
FIG. 14 is a perspective diagram showing the optical scanning apparatus 10 of the image formation apparatus 100.

Detection patterns 43A, 43B and 43C are formed as toner images in the Y-axis directions on the transfer belt 40 as shown in FIG. 14. The detection patterns 43A, 43B and 43C are illuminated by the Light Emitting Diodes 42a, 42b, and 42c, respectively. Corresponding lights reflected by the transfer belt 40 are received by the corresponding photo sensors 41a, 41b, and 41c to generate corresponding detected signals. Based on, for example, a time difference between the detected signals, the resist and the magnification in the Y-axis directions, the resist and inclination in the X-axis directions are detected as a relative position error with reference to the pattern of the toner image formed at the first station.

The paper feed tray 60 is arranged under the transfer belt 40. The paper feed tray 60 is shaped like a rectangular solid, and stores sheets of paper 61 for printing. Near the +X side edge of the top face of the paper feed tray 60, a rectangular opening is provided for feeding the paper.

The feed roller 54 takes out one sheet of the paper 61 at a time from the paper feed tray 60, and conveys the paper through the first resist roller pair 56, and between the transfer belt 40 and the transfer charger 48.

The fixing roller 50 consists of a pair of rollers. The paper 61 is pressed and heated by the fixing roller 50, and carried to the delivery roller 58 through the resist roller pair 52.

The delivery roller 58 consists of a pair of rollers, and carries the papers 61 to the delivery tray 12a one by one.

The optical scanning apparatus 10 (FIG. 13) includes the polygon mirror 14 with six reflection surfaces arranged approximately above (on the +Z side of) the photo conductor drum 17A as shown in FIG. 14. Further, the optical scanning apparatus 10 includes the fθ lens 15, reflective mirrors 106A, 106B, 106C, and 106D that are arranged one by one in the +X direction of the polygon mirror 14. Further, the optical scanning apparatus 10 includes a toroidal lens 16A arranged under the fθ lens 15, and toroidal lenses 16B, 16C, and 16D that are arranged one by one in the +X direction of the toroidal lens 16A. Further, the optical scanning apparatus 10 includes reflective mirrors 108A, 108B, and 108C that are arranged approximately above the photo conductor drums 17A, 17B, and 17C, respectively. Further, the optical scanning apparatus 10 includes the coupling lenses 12a, 12b; coupling lenses 12c, 12d; cylindrical lenses 13a, 13b, 13c, and 13d arranged in a straight line at a predetermined angle to the X-axis with reference to the polygon mirror 14; a liquid crystal device 20; the semiconductor lasers 11a, 11b; and semiconductor lasers 11c, and 11d.

The liquid crystal device 20 is capable of individually deflecting optical beams irradiated by the four semiconductor lasers 11a through 11d in the subscanning directions (in the Z-axis directions). Accordingly, beam spot positions of the optical beams condensed onto the corresponding conductor drums 17A through 17D can be adjusted by the liquid crystal device 20. That is, a writing start position error between the first through the fourth stations (namely, relative beam spot positions between the photo conductor drums 17A through 17D) due to movement of the transfer belt 40 being asynchronous to the phase angle of rotation of the polygon mirror 14 can be compensated for.

For example, the writing start timing (namely, writing start position) in the subscanning directions can be compensated for by the color gap detection apparatus 45 detecting the toner image formed on the transfer belt 40 for detecting a color error between the stations, and by driving the liquid crystal device 20 according to a detection result (the magnitude of the color error between the stations).

As described above, according to the image formation apparatus 100 of the embodiment, the beam spot positions of the optical beams condensed onto the photo conductor drums 17A through 17D are adjustable as required; for this reason, a high quality image is obtained. Further, since two or more beams are simultaneously scanned, high-speed and high-density printing is available.

According to the present invention, the image formation apparatus 100 may include a scanning line interval detecting unit for detecting a scanning line interval, wherein the liquid crystal device 20 corresponding to each beam is driven according to a result of detection by the scanning line interval detecting unit so that the scanning line interval is compensated for to be uniform. This configuration is desirable when the image formation apparatus 100 is used by a system, such as a printer and a digital copier, and when there is a possibility that the beam spot interval (mainly the interval in the sub-scanning directions, i.e., scanning line interval) may be misaligned from a final adjustment before shipment due to vibration during transportation from the factory and a limitation of an installation place at the user premises. Further, this configuration is desirable when there is a possibility that the scanning line interval may change due to high temperature inside the image formation apparatus 100 due to performing continuous printing, the passage of time, and the temperature environment of the installation place.

According to the present invention, furthermore, the image formation apparatus 100 is capable of switching print density (pixel density). Accordingly, when the image formation apparatus 100 is applied to a compound machine that has a printer function and a copier function, the pixel density can be selected between a printer mode (when the compound machine is being used as a printer), and a copy mode (when the compound machine is being used as a copying machine). For example, in the printer mode, 600 dpi is selected, and in the copy mode, 400 dpi is selected.

Further, an operator can select a pixel density by operating a console panel of the image formation apparatus 100 according to the purpose of use. By controlling the liquid crystal device 20 of the image formation apparatus 100, the pixel density can be easily changed.

According to the embodiment, all of the optical beams irradiated from the semiconductor lasers 11a through 11d are deflected by the liquid crystal device 20; however, it is possible to configure such that only the optical beams for colors cyan, magenta, and yellow are deflected by the liquid crystal device 20, where the optical beam for black is taken as the reference.

Further, the present invention is not limited to these embodiments, but variations and modifications may be made without departing from the scope of the present invention.

The present application is based on Japanese Priority Application No. 2006-050172 filed on Feb. 27, 2006 with the Japanese Patent Office, the entire contents of which are hereby incorporated by reference.

What is claimed is:

1. An optical scanning apparatus wherein a scanned surface is scanned by an optical beam irradiated from a luminous source, comprising:
   a liquid crystal device for deflecting an optical path of the optical beam by generating a potential gradient at an electrode pattern having a strip form, said electrode pattern including a plurality of transparent electrode components aligned in one direction and connected to each other through a resistor, the potential gradient being generated by applying a first driving voltage to the transparent electrode component at an end row of the electrode pattern and a second driving voltage to another end row of the electrode pattern; and
   a wavefront aberration control unit for controlling an amount of wavefront aberration generated in the liquid crystal device by controlling a reference voltage that is a middle voltage between the first and second driving voltages based on a phase modulation characteristic of the liquid crystal device in response to the potential gradient generated by the first and second driving voltages.

2. The optical scanning apparatus as claimed in claim 1, wherein
   the wavefront aberration control unit controls the reference voltage according to a deflection angle of the optical beam.

3. The optical scanning apparatus as claimed in claim 1, further comprising:
   a beam waist position detecting unit for detecting a beam waist position of the optical beam;
   wherein the wavefront aberration control unit controls the amount of the wavefront aberration based on a detection result of the beam waist position detecting unit.

4. The optical scanning apparatus as claimed in claim 1, further comprising:
   a temperature detecting unit for detecting temperature of the liquid crystal device;
   wherein the wavefront aberration control unit controls the amount of the wavefront aberration based on a detection result of the temperature detecting unit.

5. The optical scanning apparatus as claimed in claim 1, further comprising:
   an optical system that generates a power component that moves a beam waist position of the optical beam away from the luminous source if the temperature of the liquid crystal device is lower than predetermined temperature, and moves the beam waist position of the optical beam closer to the luminous source if the temperature of the liquid crystal device is higher than the predetermined temperature so as to cancel a variation of the phase modulation characteristic of the liquid crystal device.

6. The optical scanning apparatus as claimed in claim 5, wherein
   a magnitude of the power component generated by the optical system takes a minimum value near a median of a working temperature range of the liquid crystal device.

7. The optical scanning apparatus as claimed in claim 6, wherein
   the reference voltage is set up such that a fluctuation of the beam waist position takes a minimum value near the median of the working temperature range of the liquid crystal device.

8. An image formation apparatus that forms an image based on a latent image formed on a scanned surface, comprising:
   the optical scanning apparatus as claimed in claim 1 for forming latent image on the scanned surface; and
   a processing unit for forming the image on the scanned surface based on the latent image formed by the optical scanning apparatus.

9. A phase modulation method of modulating a liquid crystal device that deflects an optical beam for scanning a scanned surface, wherein the liquid crystal device comprises an electrode pattern having a strip form, said electrode pattern including a plurality of transparent electrode components aligned in one direction and connected to each other through a resistor; the method comprising:

a prediction step of predicting an amount of wavefront aberration produced when the optical beam is deflected by the liquid crystal device, wherein the prediction is based on a phase modulation characteristic of the liquid crystal device in response to a potential gradient generated by a first and second driving voltages; and a control step of controlling the first driving voltage and the second driving voltage applied to the liquid crystal device based on the amount of the wavefront aberration predicted in the prediction step.

10. The phase modulation method as claimed in claim 9, wherein the prediction step predicts the amount of the wavefront aberration based on a temperature characteristic of a phase difference characteristic curve of the liquid crystal device, and a thermometry result of the liquid crystal device.

11. The phase modulation method as claimed in claim 9, wherein the prediction step predicts the amount of the wavefront aberration based on a beam waist position of the optical beam on the scanned surface.

12. The phase modulation method as claimed in claim 9, wherein the control step controls a reference voltage that is a middle voltage between the first driving voltage applied to the transparent electrode component at an end row of the electrode pattern and the second driving voltage applied to another end row of the electrode pattern.

* * * * *